United States Patent [19]

Woerner et al.

[11] 4,185,133
[45] Jan. 22, 1980

[54] PROCESS FOR SATURATING A FIBER MAT OF OPEN STRUCTURE

[75] Inventors: Douglas C. Woerner, Northampton, Pa.; Andrew J. Manning, Randolph, N.J.

[73] Assignee: GAF Corporation, New York, N.Y.

[21] Appl. No.: 912,040

[22] Filed: Jun. 2, 1978

[51] Int. Cl.² .............................................. B05D 3/12
[52] U.S. Cl. ..................................... 427/209; 118/60; 427/366; 427/379; 427/385 R; 427/390 A; 427/211; 427/381
[58] Field of Search ............... 427/209, 211, 366, 379, 427/381, 385 R, 390 A; 118/60; 428/268

[56] References Cited

U.S. PATENT DOCUMENTS

| 2,772,181 | 11/1956 | Rogers et al. | 118/60 |
|---|---|---|---|
| 2,956,917 | 10/1960 | Fasano | 428/268 |
| 3,272,643 | 9/1966 | Pasek et al. | 118/60 |
| 3,519,460 | 7/1970 | Erb et al. | 427/202 |
| 3,551,269 | 12/1970 | Marzocchi | 428/268 |
| 3,554,851 | 1/1971 | Modigliani | 428/112 |
| 3,573,964 | 4/1971 | Jones | 427/366 |
| 3,694,927 | 10/1972 | Sorenson | 118/60 |
| 3,773,545 | 11/1973 | Erb et al. | 427/366 |
| 3,968,275 | 7/1976 | Dees et al. | 427/366 |
| 4,041,197 | 8/1977 | Gagne | 427/278 |

FOREIGN PATENT DOCUMENTS

| 778336 | 2/1968 | Canada | 427/366 |
|---|---|---|---|
| 997632 | 9/1976 | Canada | 118/60 |

Primary Examiner—John D. Smith
Attorney, Agent, or Firm—Walter C. Kehm; Joshua J. Ward

[57] ABSTRACT

Heat curable liquid polyvinylchloride plastisol or organosol resin is coated onto a porous fiber web in an amount sufficient to saturate the web. Liquid resin on one surface of the web is gelled by passing the web around a heated roll which, together with another heated roll, forms a compression nip. The web passes through the nip and around the second heated roll to gell the resin on the other surface of the web, after which the curing of the resin is completed in an oven.

9 Claims, 1 Drawing Figure

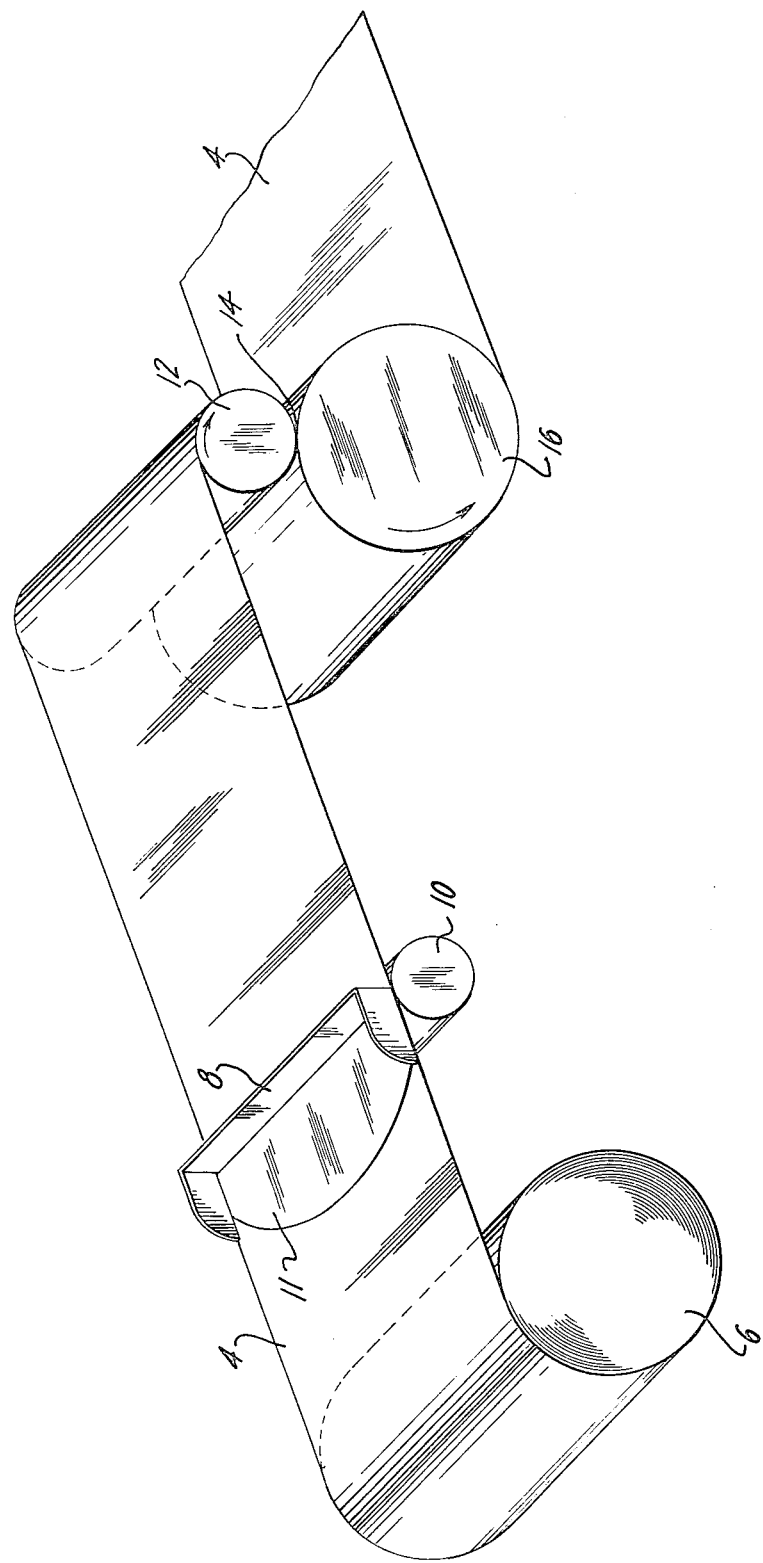

PROCESS FOR SATURATING A FIBER MAT OF OPEN STRUCTURE

BACKGROUND OF THE INVENTION

In the manufacture of decorative sheet-type covering material, such as sheet vinyl floor coverings, normal manufacturing procedure calls for coating the substrate, such as felt backing, with various plastic layers. The substrate used is typically a substrate such as felt with relatively low pore volume and the felt is frequently primed or sealed to make a suitable substrate for application of decorative and functional plastic layers. The felt used is typically an asbestos felt. Because of various hazards involved in the use of asbestos it is desirable to utilize other materials as the substrates for decorative sheet type covering materials. One of the suggested substrates is fiberglass in the form of fiberglass mats which frequently have relatively large void volumes such as on the order of 98% or more. In order to use such materials satisfactorily it is desirable to fully incapsulate the fibers of the mat or web so as to minimize glass fiber irritation during processing and installation.

It has been suggested as set forth for instance in U.S. Pat. No. 4,041,197 to coat relatively open substrates such as cotton scrim or nylon scrim with liquid plastic by first applying the plastic to the web of scrim and then passing the coated substrate between a put-on roll and a heat drum to smooth and compress the plastic coating onto the web. A similar coating operation is described in U.S. Pat. No. 3,519,460 for use on fibrous webs such as paper or felt.

SUMMARY OF THE INVENTION

In accordance with the invention a process is provided for encapsulating an open fiber web with cured polyvinyl chloride (PVC) resin to yield flexible nonporous sheet suitable as a substrate for use in the manufacture of decorative sheet-type covering material. The process of the invention comprises:
 a. coating heat-curable liquid PVC plastisol or organosol onto an open structure fiber web in an amount sufficient to sturate and encapsulate the web;
 b. gelling resin on a first surface of the web, by passing the web around a first heated roll with the first surface of the web in contact with the surface of the roll;
 c. then feeding the web, still in contact with the first heated roll, into a compression nip formed by the first roll and a second heated roll;
 d. then passing the web around the second heated roll with the second surface of the web in contact with the surface of the second roll to thereby gell resin on the second surface of the web; and
 e. thereafter completing curing of the resin.

THE DRAWING

The FIGURE is a schematic representtion of equipment suitable for carrying out the invention.

DETAILED DESCRIPTION OF THE INVENTION

As mentioned above the invention contemplates encapsulating an open structure fiber web with heat-curable PVC resin by the process summarized above. While the invention is applicable to webs or mats of open structure made from any flexible fibrous material, the preferred material is glass fibers in woven or non-wven form with webs of non-woven glass fiber mats being especially preferred. Mats or webs of fibrous material suitable for use in the invention should have openings of a suitable size so that the PVC plastisol or organosol used can penetrate the mat to insure saturation of the mat and complete coating of the mat on both sides with cured PVC resin. Complete coverage of both sides of the mat is essential to protect those handling the finished covering material from exposure to the glass fibers preferably making up the mat. When using the preferred plastisols or organosols described below, non-woven glass fiber mats suitable for use in the invention generally have void volumes greater than 98% with openings in the mat averaging between about 1 and about 20 mils in the smallest linear dimension with at least about 50% of such openings having smallest linear dimensions between about 2 and about 10 mils. Preferred mats include those having a thickness between about 10 and about 40 mils and weighing between about 1 and about 4 pounds per 100 square feet. Such mat may be manufactured by conventional techniques used for manufacturing non-woven glass mats with the glass fibers used preferably having an average diameter between about 0.2 and about 0.8 mils, and fiber lengths between about 0.2 and about 1.5 inches. Binders conventionally used for coating glass fibers may be used and where used are normally present in amounts between about 1 and about 50 wt. % of the mat. Suitable binders for coating glass fibers of mats used in the invention include for instance urea-formaldehyde, latexes, thermosetting resins, such as polyester resins, epoxy resins and the like and may include among other conventional binders those mentioned in U.S. Pat. No. 3,554,851 to Modigliani, the disclosure of which is incorporated herein by reference. The binder may of course be applied to the glass fibers in a conventional manner.

The flexible, encapsulated webs formed in accordance with the invention are useful as substrates for conventional decorative flexible sheet-type covering material including conventional wall and floor coverings such as sheet vinyl, linoleum and the like. In manufacturing such covering material, various layers of printing, plastisols, wear layers etc. may be applied to the substrate in a conventional manner.

The heat-curable liquid PVC plastisol or organosol used in the process of the invention may be any of the conventional PVC plastisols or organosols known in the art for forming PVC layers on conventional sheet vinyl flooring products. A variety of PVC plastisols and organosols suitable for use in the invention are described in U.S. Pat. Nos. 3,458,337 and 3,293,094, the disclosures of which are incorporated herein by reference.

While a wide variety of conventional PVC plastisols and organosols are suitable for use in the product and process of the invention, selection of a particular plastisol or organosol or mixture thereof suitable for a given application preferably takes into account such factors as the nature of the web to be encapsulated, the particle size of PVC resin, the viscosity and degree of solvation of the plastisol, etc. Generally, the most important factors are the nature of the web, especially the distribution and size of the openings in the web, the amount and size of resin particles in the plastisol or organosol and the viscosity of the plastisol or organosol. Desired viscosity of liquid PVC resin (i.e. plastisol or organosol) is also dependent to some extent upon the particular embodiment of the invention being employed. If the liquid PVC resin is being coated onto only one side of the web with subsequent pressure being used to force the resin through the web as described below, then the resin can generally be of somewhat higher viscosity than if it is desired to saturate the web with resin in the coater.

While suitable viscosities for liquid PVC resins used in practicing the invention may vary widely depending upon the type of web and particular processing conditions used, preferred viscosities when using the preferred glass fiber mats of the type described above include plastisols and organosols having viscosities between about 500 and about 10,000 centiposes (cp) at coating temperatures as measured by a Brookfield RVF viscometer with a number 3 spindle at 20 rpm. While coating is frequently carried out at room temperature this is by no means essential and coating temperatures between about 50° and about 120° F. are suitable with many of the commonly used plastisols and organosols.

For use with the preferred type of glass fiber mat described above, PVC resins used in practicing the invention may be suspension or dispersion resin or may be a combination of suspension and dispersion resins. Dispersion resins in general are more expensive than suspension resins, but tend to have smaller particles sizes, e.g. between about 0.5 and about 5 microns, and higher intrinsic viscosities then suspension resins. Dispersion resins are commonly made by emulsion polymerization and are well known to those skilled in the art. Suspension resins are made by suspension polymerization and have relatively lower intrinsic viscosity and relatively larger particle size than dispersion resins. Particle sizes for typical PVC suspension resins frequently range between 5 and about 50 microns. In practicing the preferred embodiments of the invention PVC plastosols or organosols in which dispersion resin comprises between about 35 and about 100 wt. % of the total PVC resin content are preferred.

Coating of the heat-curable liquid PVC plastisol or organosol onto the open structure web in accordance with the invention may be carried out by any suitable means such as knife coating, roll coating or dip saturation. Conventional reverse roll or knife-over-roll coating is preferred, especially when it is desired to saturate or substantially saturate the web during the coating process rather than depend upon subsequent pressure to force the resin through the web. Sufficient plastisol or organosol should be applied during the coating operation to allow for complete saturation and encapsulation of the web. As mentioned, the web may be completely saturated during the coating operation or complete saturation may be obtained by subsequently forcing the coating through the web or by allowing it to soak into the web before gelling.

Subsequent to coating of heat curable plastisol or organosol onto the web, the process of the invention calls for gelling the resin on a first surface of the web by passing the web around a first heated roll with the surface of the web in contact with the surface of the roll. The heated roll used for this purpose may be a conventional chrome drum of the type normally used for gelling resin. Such rolls are well known to those skilled in the art. As is well known, rotational speed of the roll, size of the roll and temperature of the surface of the roll may be varied as desired to obtain the desired gelling of the resin on the surface of the web contacting the roll. In typical applications, the roll is operated so as to provide contact times with the web surfaces of between about 1 and about 10 seconds with surface temperatures of the roll being maintained between about 290° and about 350° F. In preferred embodiments of the invention the web is maintained in constant contact with the first heated roll until passing into the nip to be described below.

As mentioned, it is within the scope of the invention to either saturate the web during coating or to coat on one side only. If the web is coated on one side only, in such a way that the coating remains principally on the coated face, then the coated surface of the web may be contacted with the surface of the first roll mentioned above with web tension around the roll being maintained sufficient to force resin through the web and onto the opposite surface of the web. As a result of passing the web over the first heated roll, PVC plastisol or organosol which has been coated on only one side of the web is forced through the web, thereby substantially saturating the web, and excess plastisol or organosol is forced out on to the second surface of the web as the web travels around the first roll. At the same time the heated surface of the roll is gelling resin on the surface of the web in contact with the roll and preferably for at least some distance through the thickness of the web.

In the preferred embodiment of the invention wherein the web is substantially saturated with plastisol or organosol during the coating step, tension on the web around the first heated roll of about 4 lb/lineal inch is required to insure continual contact of the surface of the web with the surface of the roll which insures in turn that fibers on the first surface of the mat are incorporated into the gel layer. This partial encapsulation of the web provides the reinforcement of the gel layer which is necessary to insure that the gelled plastisol separates cleanly from the first heated roll after passing through the nip.

Following gelling of resin on the first surface of the web as described above the web, still in contact with the first heated roll, passes into a compression nip formed by the first roll and a second heated roll. The pressure in the nip between the rolls is maintained sufficient so that the gelled resin on the second surface of the web is forced back into the web to fill voids therein and to provide a smooth surface of resin on the second surface of the web. Nip pressures between about 15 and about 45 pounds per lineal inch are normally adequate for this purpose. If a proper quantity of resin has been previously coated onto the web to allow for complete encapsulation, a bead of liquid or semi-liquid resin will preferably be maintained at the entrance side of the nip as taught in the above mentioned U.S. Pat. No. 3,519,460. This will further insure satisfactory filling of voids and complete encapsulation of the web by the resin. In order to insure complete encapsulation of edges as well as surfaces of the web, it is important that resin be maintained across the nip at least to and preferably slightly beyond the edges of the web.

From the nip between the first and second heated rolls the web continues around the second heated roll with the second surface of the web in contact with the surface of the second heated roll to complete gelling of the resin on the second surface and throughout the thickness of the web. Again, as mentioned in connection with the first heated roll, the dimensions, rotational speed, temperature of the surface of the second heated roll and contact time between the roll and the web may be varied in a manner well understood, by those skilled in the art to provide for the desired gelling effect. The second heated roll is for instance frequently operated so as to provide contact times between about 1 and about 10 seconds at roll surface temperatures between about 290° and about 350° F. From the second heated roll the web, which is now saturated and encapsulated with gelled plastisol or organosol, passes through conventional equipment for further curing of the resin in a conventional manner. Frequently, additional steps such as printing, application of base coat, etc. which are conventional to manufacture of decorative sheet-type covering material may be carried out before the resin is completely cured.

In the practice of the invention it is essential that the resin on the surface of the web contacted with the first heated roll be completely gelled before the web enters the nip between the two rolls. This is necessary so that the gelled surface of the plastisol or organosol can form a solid foundation against which subsequent redistribution of still fluid plastisol or organosol may be effected when the web passes through the nip to insure complete filling of voids and reinforcing of thin spots.

While the primary purpose of the first and second heated rolls described above is to properly distribute resin throughout and on the surfaces of the web and gell the resin so as to encapsulate the web with gelled resin, another very important function of the rolls is to provide the type of surface on the encapsulated web which is desired for further processing of the web into finished product, such as sheet vinyl flooring. Thus if a smooth surface is desired for printing or for application of subsequent coats of material, the surface of one of the heated rolls should be a completely smooth surface. If on the other hand a textured surface is desired, the surface of the roll may be textured accordingly. The surface of the other heated roll should of course be consistent with whatever type of surface is desired on the opposite surface of the finished web. Usually at least one of the heated rolls has a smooth surface while the other may be textured or smooth depending on the particular surface desired for further processing of the web.

For a further understanding of the invention reference may be had to the accompanying drawing which is a schematic representation of apparatus suitable for carrying out one embodiment of the invention.

Referring to the drawing, a web of glass mat 4 is fed from a roll 6 through a knife-over-roll coater including a knife 8 and a backup roll 10. The coater contains PVC plastisol or organosol in a coating bank 11 and coats the top face of the web 4 with the plastisol or organosol resin. The backup roll 10 serves to maintain a controlled spacing between the web and the knife. From the coating apparatus the web 4 travels around a first heated roll 12, through a compression nip 14 formed by the roll 12 and a second heated roll 16 and around the surface of the heated roll 16. From the heated roll 16 the web, encapsulated in gelled PVC resin, may be passed to a conventional oven (not shown) for completing the cure of the PVC resin. If desired a conventional base coat may be applied to the web before curing the resin.

The following example is intended to illustrate the practice of the invention without limiting the scope thereof.

EXAMPLE

A web of non-woven fiberglass mat approximately 15 mils thick and having a density of 1.0 pound per 100 square feet was processed in a continuous operation in the manner described above. The mat had a void volume of in excess of 98% with openings averaging between about 1 and about 20 mils in the smallest linear dimension and at least about 50% of the openings having smallest linear dimensions of between about 2 and about 10 mils. The glass fibers in the mat were a blend of fibers having diameters of 7, 13 and 16 microns and had an average fiber length of about 0.75 inch. The mat contained about 20 wt % of a modified urea-formaldehyde binder. A PVC plastisol of the following composition was applied to the mat in a layer about 20 mils thick at a temperature of 75° F. using a knife-over-roll coater to thereby saturate the mat.

| INGREDIENT | PARTS BY WEIGHT |
| --- | --- |
| PVC homopolymer dispersion resin | 100 |
| Plasticizer | 50 |
| Stabilizer | 7.5 |
| Diluent | 2 |
| Polyethylene Glycol 300 | 3 |
| $TiO_2$ Pigment | 2.5 |

The saturated mat was then passed around one-half the circumference of a first polished chrome plated roll heated to 330° F. with the uncoated face of the web contacting the roll. One and one-half seconds after contacting the roll, the web passed through a nip between the first heated roll and a second heated roll where it was subjected to a pressure of approximately 30 pounds per lineal inch. The web released easily from the first roll and wrapped around one-half the circumference of the second heated roll, which has also a polished chrome plated roll heated to 330° F. The sheet again released freely when removed from the second heated roll. The total time was approximately 1½ seconds on the first roll and 3 seconds on the second roll. The finished sheet was totally encapsulated with resin and was free of pores and pin holes and was smooth on the surface contacted by the second roll.

When the coated web contacted the first heated roll line tension of about 4 pounds per lineal inch held it firmly against the roll. Heat transferred from the surface of the roll gelled the surface of the plastisol with gellation proceeding through the mat, thus incorporating fibers of the mat in a resin matrix. The compression nip then forced still fluid plastisol back into the mat, filling holes and reinforcing thin spots. The redistributed plastisol gelled quickly in the compression nip and released smoothly from the first roll when the web left the nip and passed around the second roll. After exiting from the nip, heat from the second roll completed the gellation of the resin.

While the invention has been described above with respect to certain embodiments thereof, it will be understood by those skilled in the art that various changes and modifications may be made without departing from the spirit and scope of the invention.

What is claimed is:

1. A method for encapsulating an open structure fiber web in polyvinylchloride resin comprising:
   (a) coating heat-curable liquid polyvinylchloride plastisol or organosol onto an open structure fiber web in an amount sufficient to saturate and encapsulate the web;
   (b) gelling resin on a first surface of the web by passing the web around a first heated roll with the first surface of the web in contact with the surface of the heated roll;
(c) then feeding the web, still in contact with the first heated roll, into a compression nip formed by said first roll and a second heated roll;
(d) then passing the web around the second heated roll with the second surface of the web in contact with the surface of the second heated roll to thereby gell resin on the second surface of the web; and
(e) thereafter completing curing of the resin.

2. Method according to claim 1 wherein the web is saturated with resin during step (a) of claim 1.

3. Method according to claim 2 wherein the surface of the web passed in contact with the surface of the first heated roll is opposite the surface on which the plastisol or organosol is coated.

4. Method according to claim 1 wherein the web is subjected to a pressure between about 15 and about 45 pounds per lineal inch in the compression nip.

5. Method according to claim 1 wherein the quantity and viscosity of the plastisol or organosol coated onto the web is selected to maintain a bead of resin in the compression nip to act as a reservoir of resin to fill voids or depressions on the second surface of the web.

6. Method according to claim 5 wherein the web is a non-woven mat of glass fibers.

7. Method according to claim 6 wherein:
(a) the mat has a void volume of at least about 98% and weighs between about 1 and about 4 pounds per 100 square feet;
(b) openings in the mat average between about 1 and about 20 mils in the smallest linear dimension with at least 50% of such openings having smallest linear dimensions between about 2 and about 10 mils; and
(c) the glass fibers making up the mat have average diameters between about 0.2 and about 0.8 mils and fiber lengths between about 0.2 and about 1.5 inch.

8. Method according to claim 1 wherein viscosity of the resin as coated onto the web is between about 500 and about 10,000 centiposes.

9. Method according to claim 1 wherein:
(a) the web is saturated with resin during coating of the web according to step (a) of the claim 1;
(b) the web is subjected to a pressure between about 15 and about 45 pounds per lineal inch in the compression nip;
(c) the quantity and viscosity of the plastisol or organosol coated onto the web is selected to maintain a bead of such plastisol or organosol in the compression nip to act as a reservoir of coating material to fill depressions in the second surface of the web;
(d) the viscosity of the plastisol or organosol coated onto the web is between about 500 and about 10,000 centiposes; and
(e) the web is a non-woven web of glass fibers of average diameter between about 0.2 and about 0.8 mils and average fiber lengths between about 0.2 and about 1.5 inch, the mat having a weight between about 1 and about 4 pounds per hundred square feet, a void volume of at least about 98% and openings the smallest linear dimensions of which average between about 1 and about 20 mils in the smallest linear dimension with at least about 50% of such openings having smallest linear dimensions between about 2 and about 10 mils.

* * * * *